(12) United States Patent
Feder et al.

(10) Patent No.: US 9,164,234 B2
(45) Date of Patent: Oct. 20, 2015

(54) SPLICING TWISTED MULTIPLE CORE OPTICAL FIBERS

(71) Applicant: OFS Fitel, LLC, Norcross, GA (US)

(72) Inventors: Kenneth S Feder, Murray Hill, NJ (US); Yue Liang, Peachtree City, GA (US)

(73) Assignee: OFS FITEL, LLC, Norcross, GA (US)

( * ) Notice: Subject to any disclaimer, the term of this patent is extended or adjusted under 35 U.S.C. 154(b) by 118 days.

(21) Appl. No.: 14/105,424

(22) Filed: Dec. 13, 2013

(65) Prior Publication Data

US 2014/0169747 A1    Jun. 19, 2014

Related U.S. Application Data

(60) Provisional application No. 61/737,307, filed on Dec. 14, 2012.

(51) Int. Cl.
*G02B 6/255* (2006.01)

(52) U.S. Cl.
CPC ............ *G02B 6/2551* (2013.01); *G02B 6/2555* (2013.01)

(58) Field of Classification Search
None
See application file for complete search history.

(56) References Cited

U.S. PATENT DOCUMENTS

| 5,168,617 | A | 12/1992 | Tsuchida et al. |
| 5,452,394 | A * | 9/1995 | Huang ............................ 385/123 |
| 5,706,380 | A | 1/1998 | Le Noane et al. |
| 6,148,639 | A | 11/2000 | Zheng et al. |
| 6,467,973 | B2 | 10/2002 | Takahashi et al. |
| 6,711,333 | B2 | 3/2004 | West et al. |
| 6,791,067 | B2 | 9/2004 | Tanabe |
| 7,003,200 | B2 | 2/2006 | Huang et al. |
| 7,140,786 | B2 | 11/2006 | Takayanagi et al. |
| 8,478,098 | B2 | 7/2013 | Hayashi et al. |
| 2011/0146071 | A1 * | 6/2011 | Zheng et al. .................... 29/869 |

OTHER PUBLICATIONS

Furukawa Electric Co Ltd., S183PM II Fusion Splicer User's Manual, pp. 6-17 to 19, 8-8 to 9, and 8-49 (Issue 8, undated).

* cited by examiner

*Primary Examiner* — Mike Stahl
(74) *Attorney, Agent, or Firm* — Law Office of Leo Zucker (57) ABSTRACT

A method of coupling optical fibers containing cores or other structures that twist about the axis of one or both fibers. The fiber end faces are aligned axially to confront one another, and side view images of end regions of the fibers including the contained cores or structures are produced. For each fiber, a brightness profile of a side view image is obtained at an axially offset position from the fiber end face. One or both fibers are rotated about their axes until the brightness profiles for each fiber indicate certain cores or structures in the fibers are aligned. For each fiber, an additional amount of twist from the offset position to the fiber end face is determined. One or both fibers are rotated again to compensate for the additional twist in each fiber, so that the fibers are aligned optimally when coupled.

14 Claims, 5 Drawing Sheets

SPLICING TWISTED MULTIPLE CORE OPTICAL FIBERS

CROSS REFERENCE TO RELATED APPLICATION

This application claims priority under 35 U.S.C. §119(e) of U.S. Provisional Patent Application No. 61/737,307 filed Dec. 14, 2012, titled "Splicing Twisted Multiple Core Fiber With a Profile Alignment System Based Fusion Splicer" and incorporated herein by reference in its entirety.

BACKGROUND OF THE INVENTION

1. Field of the Invention

The present invention relates to a technique for splicing or coupling optical fibers to one another, particularly optical fibers that contain cores or other structures that are twisted about the axes of the fibers.

2. Discussion of the Known Art

Before coupling two optical fibers to one another such as by fusion splicing, the end faces of the fibers must be cleaved and aligned to confront one another so that the cores of the fibers can be fused to one another with negligible attenuation of signals that will pass between the fused cores. Most popular fusion splicers use a so-called profile alignment system (PAS) to effectuate the fiber alignment and fusing operations. In a PAS, two cameras are positioned to produce two side view images of a confronting end region of each fiber, such that the views are taken 90 degrees apart in a plane normal to the fiber axis. The cameras also serve to measure and obtain a profile of the brightness of each image from one side of the fiber to the diametrically opposite side, at a small offset distance axially from the end face of the fiber. The offset distance serves to avoid optical noise and issues relating to the quality of the cleaved end faces.

Fusion splicers that operate by directly imaging the end face of each fiber in the axial direction are also known, and thus may be capable of handling fibers containing one or more cores. For example, a CAS-4000 series of fusion splicers offered by Vytron of Morganville, N.J. Such fusion splicers are more complicated and at least double the cost compared to PAS splicers, however.

As mentioned, PAS fusion splicers display two side views of the end region of each fiber, one looking in an "X" direction in a plane normal to the length of the fiber and the other in a "Y" direction, wherein the X and the Y views are separated by 90 degrees in the normal plane. The relative alignment of the two fiber ends is adjusted either automatically by the fusion splicer, or manually until the X and the Y brightness profiles of the fibers are substantially identical to one another, or, if the fibers are dissimilar, until the profiles show a certain desired alignment. The end faces of the fibers are advanced (Z-direction) to abut one another, and the fibers including their cores are fused together by an electric arc discharge. See, U.S. Pat. No. 5,638,476 (Jun. 10, 1997); U.S. Pat. No. 6,791,067 (Sep. 14, 2004); and U.S. Pat. No. 7,003,200 (Feb. 21, 2006), all of which are incorporated by reference.

For example, a model S183PM II fusion splicer available through OFS Fitel, LLC, uses an active four-dimensional alignment system (X, Y, Z, and θ-rotation about fiber axis) to align various kinds of optical fibers to be spliced including polarization maintaining (PM) fibers, and a controllable electric arc to melt the fiber glass and fuse the fibers together. The system can operate to splice either identical or dissimilar optical fibers based on the obtained brightness profiles and/or other optical characteristics of the fibers, and a strong physical joint between the fibers with very low power loss or back-reflection (mismatch) is achieved.

A proper alignment of two fibers to be spliced may also be obtained experimentally by connecting one of the fibers to a light source and the other fiber to a power meter, and selecting an alignment that maximizes power output after performing a series of alignment adjustments. Apart from consuming much time, such a solution may also require stripping of light in the cladding modes of certain fibers, however.

Fibers containing multiple cores are now in use. See, e.g., U.S. Pat. No. 5,706,380 (Jan. 6, 1998), and U.S. Pat. No. 6,711,333 (Mar. 23, 2004). Methods of splicing multiple core fibers are disclosed in the mentioned '380 patent, and in U.S. Pat. No. 6,148,639 (Nov. 21, 2000). Also, a PAS fusion splicer previously offered by Ericsson as model FSU-995PM had a program (#60) that was listed as multicore.

The cores in some multiple core fibers may also be twisted helically about the axis of the fiber at a specified rate. Such fibers are used, inter alia, for sensing applications in the medical field wherein gratings are written in the fiber, and a fanout is provided to access each of the cores in the fiber.

If two twisted multiple core fibers are to be fusion spliced, it may be difficult to use existing PAS type splicers because, as mentioned, the brightness profiles are measured at positions that are offset axially from the end faces of the fibers. Therefore, even if a conventional PAS splicer determines, based on the measured profiles, that the fibers and their cores are aligned properly to be fused, the cores may nevertheless be misaligned at the fiber end faces because of the additional core twist from the positions of the profiles to the end faces. If the fibers are fusion spliced in such a condition, then signals passing between the fused cores will be attenuated at an unacceptable level.

Accordingly, there is a need for a fusion splicing technique that is capable of splicing fibers containing multiple cores, particularly twisted multiple cores, in a way that achieves a strong physical joint between the fibers and introduces only a negligible degree of attenuation between the spliced cores.

SUMMARY OF THE INVENTION

According to the invention, a method of coupling two optical fibers to one another, wherein one or both of the fibers contain cores, stress rods, holes, or other structures the positions of which rotate or twist about the axis of the fiber at a determined rate over the length of the fiber, includes positioning the fibers so that their end faces are axially aligned and the cores or structures contained in the fibers confront one another at the end faces, and producing one or more side view images of end regions of the fibers and certain ones of the cores or other structures in the fibers. For each fiber, a brightness profile is obtained of a side view image at a known axially offset position from the end face of the fiber, and one or both of the fibers are rotated about their axes until the brightness profiles for each fiber indicate that certain ones of the cores or structures in the fibers are aligned with one another at the offset positions of the profiles.

For each fiber, an additional amount of twist is determined for the contained structures, from the known offset position to the end face of the fiber. One or both of the fibers are rotated about their axes to compensate for the additional amount of twist, so that the cores or other structures in each of the fibers are optimally aligned when the end faces of the fibers are coupled to one another.

For a better understanding of the invention, reference is made to the following description taken in conjunction with the accompanying drawing and the appended claims.

DETAILED DESCRIPTION OF THE INVENTION

Figure 1:
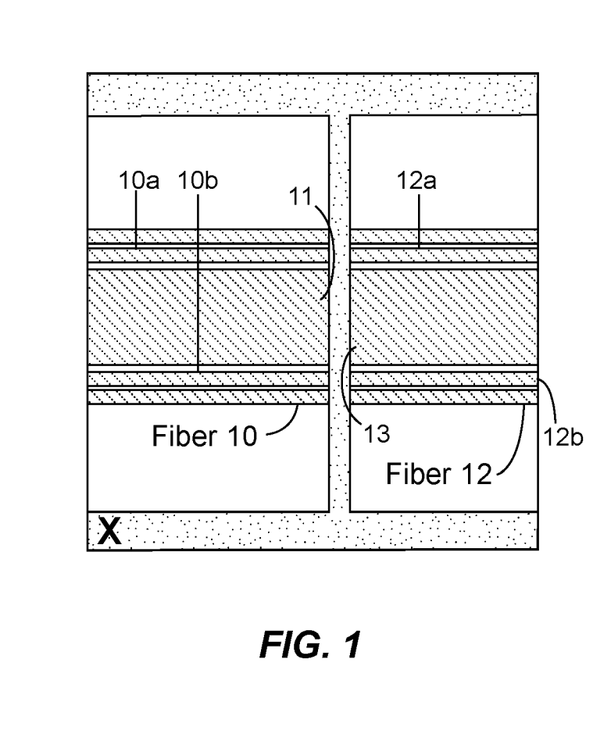
FIG. 1 is a side view image of end regions of two non-twisted multicore fibers prior to splicing end faces of the fibers to one another in a profile alignment system (PAS) fusion splicer, as seen in an X direction normal to the axes of the fibers.
Figure 2:
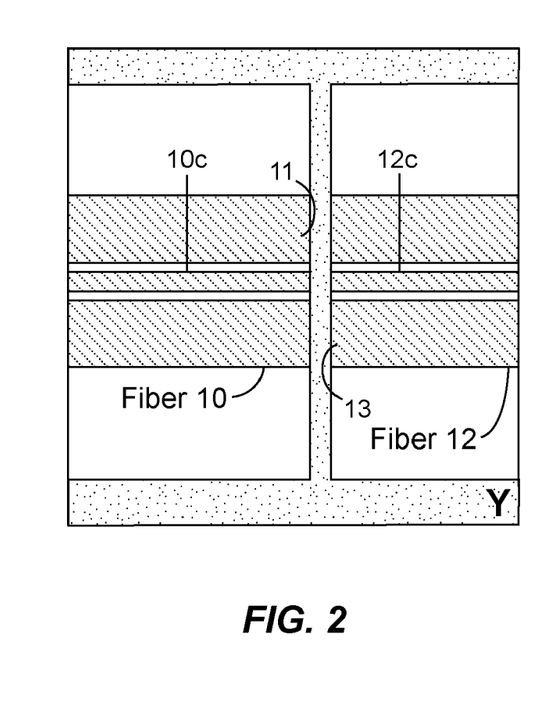
FIG. 2 is a side view image of the end regions of the fibers in FIG. 1 as seen in a Y direction that is also normal to the fiber axes and at 90 degrees from the image of FIG. 1.

FIGS. 1 and 2 illustrate the use of a profile alignment system (PAS) type fusion splicer for splicing two identical, non-twisted multiple core fibers 10, 12 to one another. FIG. 1 shows side view images of end regions of the fibers 10, 12 in an X direction normal to the fiber axes, and after the end faces of the fibers are aligned axially to confront one another prior to splicing. That is, any lateral offset normal to the axis of the fibers is minimized. FIG. 2 shows side view images of the end regions of the fibers as seen in a Y direction normal to the fiber axes and at 90 degrees from the view in FIG. 1. As seen in FIGS. 1 and 2, the fiber 10 has an end face 11 that is cleaved or otherwise prepared to be fused to a confronting end face 13 of the fiber 12.

In the illustrated embodiment, each fiber 10, 12 contains seven cores, one of which coincides with the axis of the fiber, and the other six are disposed symmetrically at 60 degree intervals about the fiber axis without twist. Due to the symmetry of the cores in the fibers 10, 12, there are six possible alignments of the fibers for splicing, i.e., a splice match will exist for every 60 degrees of rotation of one fiber relative to the other.

In the X image of FIG. 1, only two cores 10a and 10b in the fiber 10 among all the cores in the fiber, and two cores 12a and 12b in the fiber 12 among all the fiber cores, are distinguishable. In the Y image of FIG. 2, only one core 10c in fiber 10 and one core 12c in fiber 12 are distinguishable. Note that with multiple core fibers such as the fibers 10, 12, the fiber cores that are viewable in each fiber in the X image of FIG. 1, can be different from the cores that are seen in each fiber in the Y image of FIG. 2.

Figure 3:
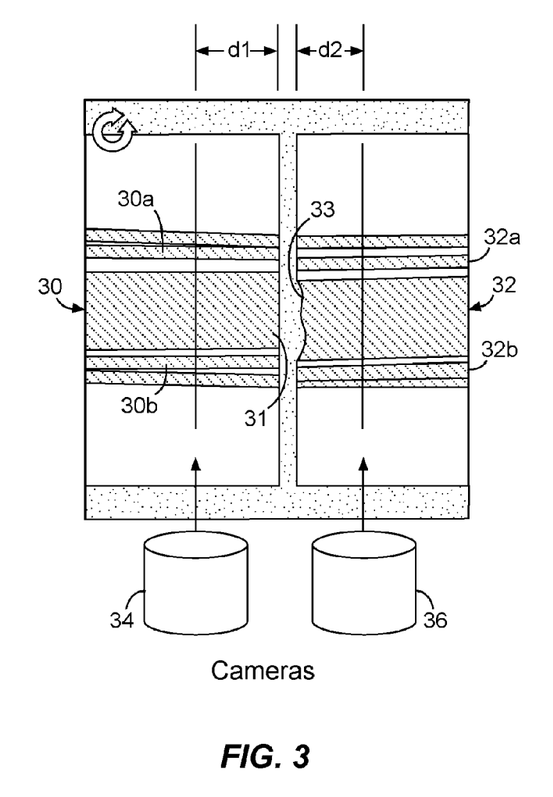
FIG. 3 is a side view image of end regions of two twisted multicore fibers prior to splicing, including cameras positioned to obtain the image and to measure brightness profiles at axially offset positions from the fiber end faces, as seen in an X direction.

FIG. 3 is an X side view image of the end regions of two identical twisted multicore fibers 30, 32 prior to splicing in a PAS type fusion splicer. The fiber 30 contains seven cores, six of which are twisted about the fiber axis. Two of the cores, 30a and 30b are visible in FIG. 3. Fiber 32 also contains seven cores, six of which are twisted and two of which, 32a and 32b are visible. Fiber 30 has an end face 31 that is cleaved or otherwise prepared for fusion splicing to a confronting end face 33 of the fiber 32. As shown, the cleave on the end face 33 of fiber 32 is not very clean, but highlights the fact that the end faces of the fibers to be spliced may not always be very well defined.

As noted above for the untwisted core fibers 10, 12, because the twisted core fibers 30, 32 each contain seven cores, not all of the cores are likely to be distinguished in any one view due to focusing limitations and lensing effects. It is not necessary for all of the cores to be viewable, however, provided a clear brightness profile can be obtained through the end regions of the fibers.

Two cameras 34, 36 within the fusion splicer are positioned at corresponding axial offset positions d1, d2 from the end faces 31, 33 of the fibers. Each camera is constructed and arranged in a known manner with associated optics and processing components, to image the end region of its associated fiber including the fiber cores, and to obtain a brightness profile at the offset position of the camera. The profiles at the camera offset positions d1, d2 can be displayed graphically as shown in FIG. 4.

Figure 4:
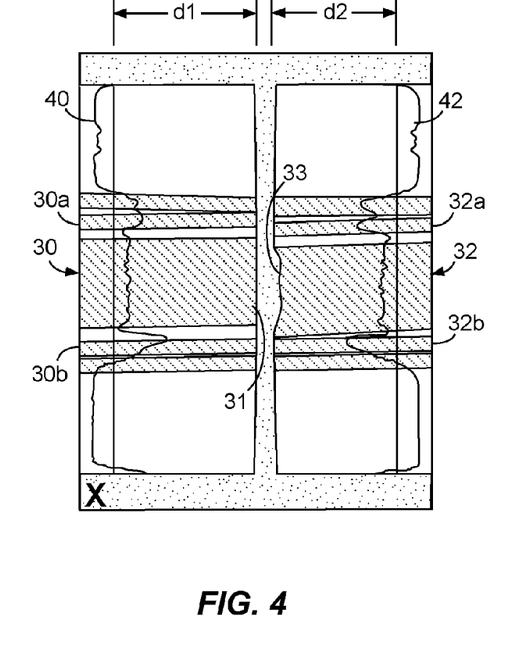
FIG. 4 shows the brightness profiles of the fibers in FIG. 3, as measured by the cameras at the axially offset positions.

Note in FIG. 4 that the X image brightness profiles 40, 42 through the end regions of the fibers 30, 32 in FIG. 4 are substantially identical in graphic form. Thus, if the fiber cores 30a, 30b and 32a, 32b were not twisted, the brightness profiles 40, 42 in FIG. 4 would indicate correctly that the cores in each of the fibers 30, 32 are aligned properly for splicing at the end faces 31, 33 of the fibers. As seen in the X image views of FIGS. 3 and 4, however, this is not true because the cores 30a, 30b and 32a, 32b continue to twist about the axes of the fibers over the distances d1 and d2 to the corresponding end faces 31, 33 of the fibers. That is, if the fibers 30, 32 are spliced with the alignment shown in FIGS. 3 and 4, signal losses through the cores will be relatively high. The attenuation introduced due to improper core alignment will depend on factors including the distance from the center of each fiber to the misaligned core(s), the twist rate, and the offset positions at which the cameras 34, 36 measure the brightness profiles. With the misalignment depicted in FIGS. 3 and 4, the estimated loss was about 1 dB. The loss would increase with a higher twist rate.

Specifically, at the end face 31 of fiber 30, the cores 30a, 30b, together with the remaining four twisted cores in the fiber 30, will be angularly displaced in one sense by an angle θ1 degrees about the axis of the fiber from the positions of the cores at the offset d1 where the brightness profile 40 of the fiber 30 was measured. At the end face 33 of fiber 32, the cores 32a and 32b, and the remaining four twisted cores in fiber 32 will be angularly displaced in the opposite sense by an angle θ2 degrees about the axis of the fiber from the positions of the cores at the offset d2 of the brightness profile 42. Therefore, to avoid high signal losses through the fibers 30, 32, and according to the invention, one or both of the fibers 30, 32 are rotated about their axes prior to splicing so as to compensate for the above mentioned angular displacements θ1 and θ2 of the twisted fiber cores. For example, prior to splicing, fiber 30 may be rotated by θ1 degrees, and fiber 32 rotated in the opposite sense by θ2 degrees. Alternatively, only one of the fibers 30, 32 may be rotated by θ1+θ2 degrees, and the two fibers then spliced together.

The angular core displacements θ1 and θ2 are calculated as follows:

θ1(degrees)=360 deg per twist×(rate of core twist for fiber 30)×$d1$

θ2(degrees)=360 deg per twist×(rate of core twist for fiber 32)×$d2$ (E.g., If the twist is clockwise, then theta has a positive sign, and if the twist is counterclockwise, then theta has a negative sign)

The rate of core twist for fiber 30 is the number of rotations of the fiber cores per unit length of the fiber such as may be set during the process of drawing the fiber 30. Likewise, the rate of core twist for fiber 32 is the number of rotations of the fiber cores per unit length of the fiber established by the fiber draw process.

Figure 5:
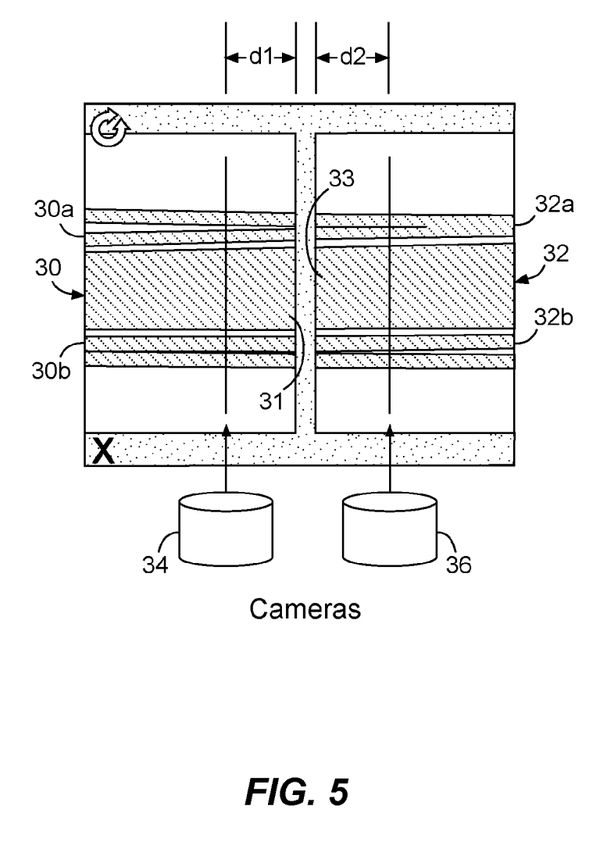
FIG. 5 is a side view image of the end regions of two twisted multicore fibers in the X direction, after one or both fibers are rotated about their axes to compensate for additional core twist from the offset positions to the end faces of the fibers, according to the invention.

FIG. 5 shows an X image view of two twisted multicore fibers 30, 32 prior to splicing in a PAS type fusion splicer after either one or both of the fibers are rotated by angles θ1 and θ2 to compensate for the additional twist of the cores over the offset distances d1 and d2 at which brightness profiles were derived. Note in FIG. 5 that the cores of the two fibers are now properly aligned at the fiber end faces 31, 33. As a result, only negligible signal loss will be introduced in the cores of the fibers when spliced.

It will be understood that if the offset positions d1 and d2 at which the brightness profiles are measured each coincide with, or are very close to, the end faces 31, 33 of the fibers 30, 32, then θ1 and θ2 may be assumed to be zero so that compensation for additional core twist may be unnecessary.

EXAMPLE

Using a modified Fitel model S183PM II fusion splicer in a polarization maintaining (PM) fiber mode, the offset values d1, d2 for various twisted core optical fibers to be spliced according to the invention were found and pre-defined as follows:

d1=80 μm
d2=85 μm

Pairs of twisted multicore fibers were spliced to one another. Each of the fibers contained seven cores one of which was a center (axial) core, and the remaining six cores had one of the following twist rates:

0 (no twist)
−65 (counter clockwise) twists/m
−50 (counter clockwise) twists/m

The angles θ1 and θ2 needed to rotate the fibers before splicing in order to compensate for the core twist from the offset positions d1 and d2 where the image brightness profiles of the end regions of the fibers are substantially identical, to the end faces 31, 33 of the fibers, are determined as follows:

| Core twists/meter | d1 offset (um) | θ1 | d2 offset (um) | θ2 |
|---|---|---|---|---|
| 0 | 80 | 0 | 85 | 0 |
| −65 | 80 | −1.87 | 85 | −1.99 |
| −50 | 80 | −1.44 | 85 | −1.53 |

To compensate for the additional core twist (theta), and assuming the fibers 30, 32 in FIGS. 3-5 are the fibers to be spliced, any one of the following options will apply:

1. Rotate both fibers 30, 32 according to the θ1 and the θ2 compensation values obtained for each fiber.
2. Rotate only fiber 30 according to the cumulative compensation values of θ1 and θ2.
3. Rotate only fiber 32 according to the cumulative compensation values of θ1 and θ2.

If the core twist is clockwise, then the values of both θ1 and θ2 will be positive, and options 1 to 3 above will remain the same.

Pairs of fibers containing cores having the same or dissimilar twist rates (including zero twist in one of the fibers) were spliced using option 2, above. The total cumulative value of θ1 and θ2 applied to fiber 30 before splicing each pair of fibers 30, 32 together was therefore calculated as follows:

| Fiber 30 core twist/m | Fiber 32 core twist/m | Total twist compensation (deg.) |
|---|---|---|
| −65 | −65 | −3.86 |
| −50 | −50 | −2.97 |
| −50 | −65 | −3.43 |
| −65 | 0 | −1.87 |
| −50 | 0 | −1.44 |
| 0 | −65 | −1.99 |
| 0 | −50 | −1.53 |

The fusion splicer was set to the polarization maintaining (PM) mode, in which the splicing program allows an operator to set a "THETA_OFFSET" value of from −20 to +90 degrees to meet various splicing needs. If a pair of single core PM fibers are to be spliced so that the fiber end faces are aligned at a 90 degree rotational offset (depolarization) before splicing, the "THETA_OFFSET" parameter will allow that to happen. In the present example, the THETA_OFFSET value was instead set to equal the total theta compensation required for the particular pair of twisted multicore fibers to be spliced. For example, referring to the above table, in the case of splicing a multicore −65 twist/m fiber to another multicore −65 core twist/m fiber, the THETA_OFFSET value should be set to −3.86.

If the cores of a fiber to be spliced are arranged so that the brightness profiles exhibit radial symmetry, there may be multiple angular solutions. A least squares fit or averaging method may then be used in a known manner to choose an optimal solution.

The table below compares measured signal losses through the fused cores of two twisted multicore fibers when spliced without rotational compensation (i.e., as though the cores were not twisted), with core signal losses measured for the same two fibers when spliced with rotational compensation according to the invention.

| | 65 TPM FIBER to 65 TPM fiber splice loss (dB) Theta offset = −4 deg | | | | | NO THETA OFFSET splice 6 |
|---|---|---|---|---|---|---|
| Core | Splice #1 | Splice #2 | Splice #3 | Splice #4 | Splice #5 | |
| 1 | −0.16 | −0.15 | −0.18 | −0.13 | −0.17 | −0.59 |
| 2 | −0.2 | −0.14 | −0.04 | −0.16 | −0.42 | −0.66 |
| 3 | −0.24 | −0.22 | −0.08 | −0.07 | −0.27 | −1.21 |
| 4 | −0.18 | −0.15 | −0.09 | −0.12 | −0.31 | −0.96 |
| 5 | −0.03 | −0.16 | −0.01 | −0.31 | −0.57 | −1.5 |
| 6 | −0.26 | −0.11 | −0.06 | −0.07 | −0.15 | −1.6 |
| 7 | −0.07 | −0.03 | −0.05 | −0.05 | −0.07 | −0.05 |
| AVG | −0.16 | −0.14 | −0.07 | −0.13 | −0.28 | −0.94 |
| MIN | −0.03 | −0.03 | −0.01 | −0.05 | −0.07 | −0.05 |
| MAX | −0.26 | −0.22 | −0.09 | −0.31 | −0.57 | −1.60 |

Note that in the above table, THETA_OFFSET was set to a nearest integer value (−4, instead of −3.86) due to the limits in the operating software at the time of the measurements.

Figure 6:
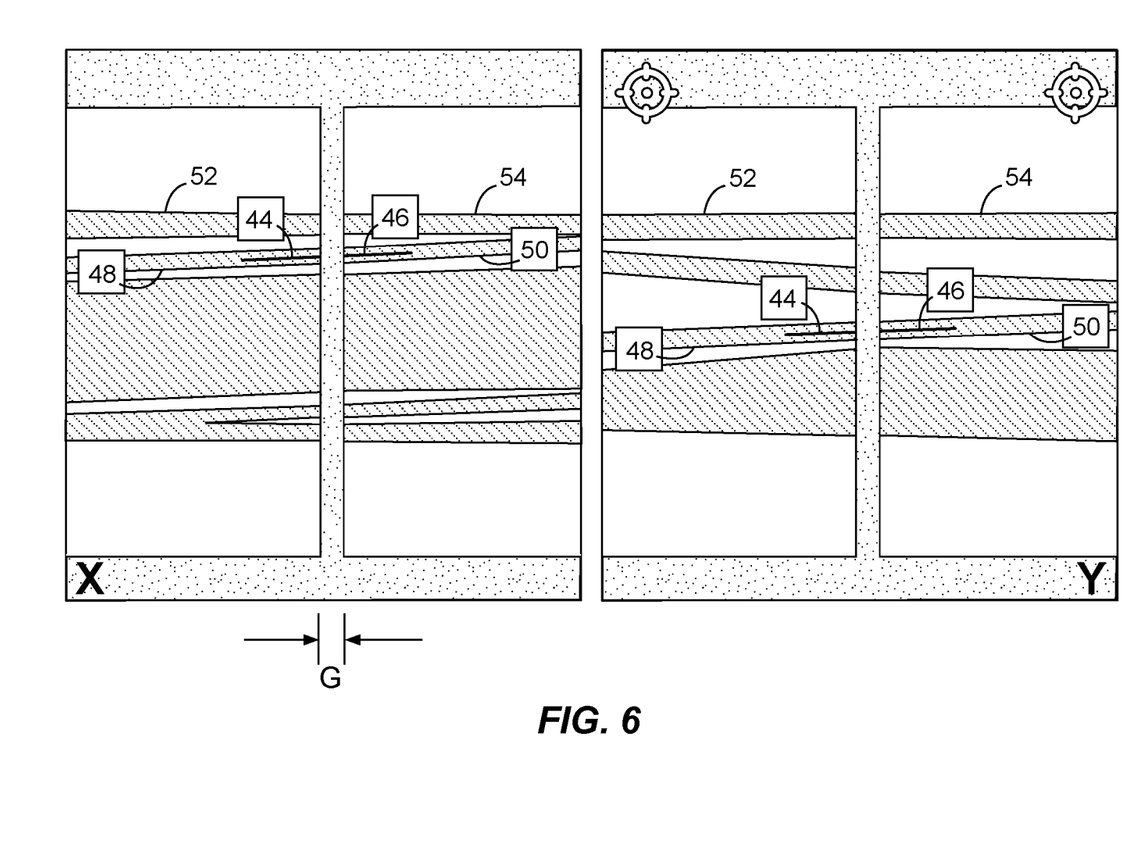
FIG. 6 shows side view images of end regions of two identical twisted multicore fibers before splicing, including slope lines constructed and superimposed on two cores to be fused when the fibers are spliced.

Even without knowing the twist rate of the cores in two multicore fibers to be spliced beforehand, a method of connecting the endfaces of each fiber may be achieved using known image pattern recognition solutions. For example, as shown in the X side view in FIG. 6, when splicing two multicore fibers 52, 54 the cores of which have the same twist rate and symmetrical configuration about the fiber axes, two slope lines 44, 46 may be constructed based on a clear and bright image of any two cores 48, 50 to be fused. The slope lines 44, 46 may then be aligned with and displayed over the images of the cores 48, 50, near the endfaces of the fibers as shown. If one or both fibers are rotated about their axes until the endpoints of the slope lines 44, 46 at the fiber endfaces are axially aligned, then all the cores in both fibers will be properly aligned when the fibers are spliced. That is, after the rotation, the slope lines 44, 46 would coincide if the gap were eliminated.

Figure 7:
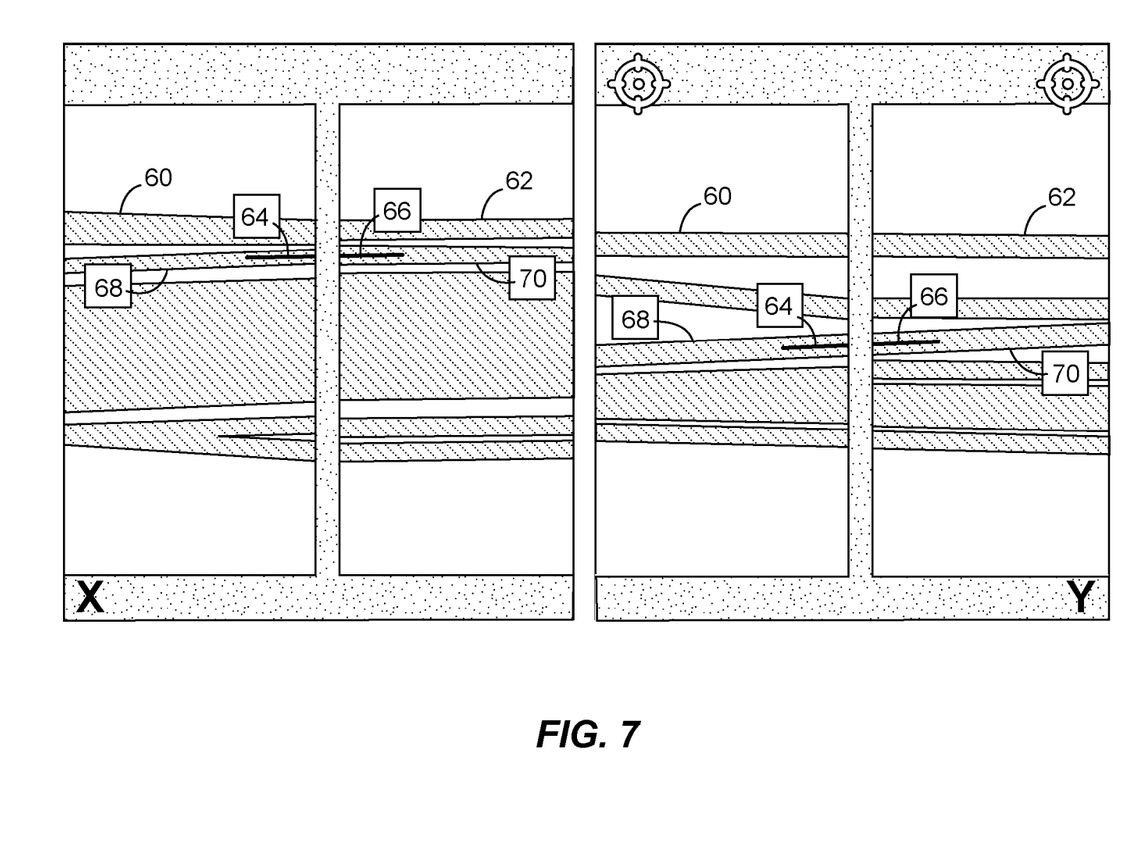
FIG. 7 shows side view images of end regions of two twisted multicore fibers before splicing as in FIG. 6, wherein the cores of the fibers have different twist rates.

As seen in the X side view in FIG. 7, when splicing two multicore fibers 60, 62 the cores of which have different twist rates but the same symmetrical configuration, two slope lines 64, 66 may also be constructed based on a clear and bright image of any two cores 68, 70 to be fused. The slope lines 64, 66 can be aligned with and displayed over the images of the cores 68, 70 near the endfaces of the fibers, and correct alignment of all the cores in both fibers may be achieved as long as one or both fibers can be rotated to align the facing end points of the slope lines 64, 66 with one another at the fiber endfaces.

Additionally, the twist rate of the cores in a multicore fiber, and the sense of the twist, i.e., whether clockwise or counter-clockwise, can be determined by a series of measurements each taken after a known fiber movement. For example, a clear side view image or profile may be obtained at a distance d1 from the fiber endface, followed by a second image or profile at distance d2. The twist rate can then be calculated by rotating the fiber in one or the other direction until the profiles obtained for the two measurements are identical. If the fiber cores are not twisted, then the two profiles should be identical without a need for any rotation. Further measurements should confirm that d1 and d2 do not coincide with points where the cores rotate an integer number of revolutions, or, if the fiber profiles exhibit symmetry, at different angular locations on the fiber.

In many cases, the cores of a multicore fiber are arranged in a symmetrical pattern as mentioned earlier. Such a fiber will therefore produce two or more identical brightness profiles when imaged at a given axial position over a 360 degree rotation. The existence of such symmetry can therefore be confirmed by obtaining a number of profiles at the same position over 360 degrees, and finding a number of identical profiles.

While the foregoing represents preferred embodiments of the present invention, it will be understood by persons skilled in the art that various changes, modifications, and additions can be made without departing from the spirit and scope of the invention. For example, the inventive splicing technique may be applied not only to splicing fibers containing multiple twisted cores, but also to fibers that contain stress rods, holes, or other structures the positions of which rotate or twist about the axis of the fiber at a determined rate over the length of the fiber. Additionally, the inventive technique may be applied to mechanical couplers in which the positions of the fibers are fixed mechanically after alignment, instead of being fusion spliced. Accordingly, the invention includes all such changes, modifications, and additions that are within the scope of the following claims.

We claim:

1. A method of coupling two optical fibers to one another, wherein one or both of the fibers contain cores, stress rods, holes, or other structures the positions of which rotate or twist about the axis of one or both fibers at a determined rate over at least a portion of the length of the fiber, comprising:
    positioning the fibers to be coupled in axial alignment with one another so that end faces of the fibers and cores or other structures contained in the fibers confront one another at the end faces in the axial direction;
    producing one or more side view images of end regions of the aligned fibers adjacent to the end faces including certain ones of the cores or other structures contained in the fibers;
    for each fiber, obtaining a brightness profile of a given side view image of the fiber wherein the profile is obtained at a known axially offset position from the end face of the fiber;
    first rotating one or both of the fibers about the axes of the fibers until the brightness profiles obtained for each fiber indicate that certain ones of the cores or other structures contained in the fibers are aligned with one another at the offset positions of the profiles;
    for each fiber, determining an additional amount of twist of the structures in the fiber from the known offset position to the end face of the fiber; and
    second rotating one or both of the fibers about their axes to compensate for the additional amount of twist determined for the structures in each fiber, so that the structures in each of the fibers are aligned optimally when the end faces of the fibers are coupled.

2. The method of claim 1, including fusion splicing the optical fibers to one another after the second rotating step.

3. The method of claim 1, including providing a camera for producing the side view images in the end region of each fiber.

4. The method of claim 1, including, for each fiber, determining the additional amount of twist by multiplying a known twist rate for the structures contained in an end region of the fiber, by the distance from the offset position to the end face of the fiber.

5. The method of claim 1, including rotating only one of the fibers about its axis by an amount corresponding to the sum of the additional amounts of twist determined for the structures in each of the fibers.

6. The method of claim 1, including producing two side view images of the end region of each of the aligned fibers, including a view looking in an X or horizontal direction normal to the fiber axis, and a view looking in a Y or vertical direction normal to the fiber axis.

7. The method of claim 1, wherein the offset positions at which the brightness profiles are obtained for each fiber, are substantially close to the end face of the fiber, thus minimizing any compensation needed for an additional amount of twist of the structures in the fiber.

8. The method of claim 1, including using a profile alignment system (PAS) fusion splicer to perform at least some of the steps.

9. The method of claim 8, including operating the fusion splicer in a mode that enables one or both of the fibers to be rotated a desired amount about the axis of the fiber, and setting a programmed offset angle substantially equal to the sum of the additional amounts of twist determined for the structures in each of the fibers.

10. The method of claim 1, including determining a rate of twist of the cores or other structures in one or both of the fibers by obtaining a first image brightness profile at a first known distance from the endface of the fiber, obtaining a second image brightness profile at a second known distance from the endface of the fiber, and rotating the fiber until the second profile is substantially identical to the first profile.

11. A method of coupling two optical fibers to one another, wherein one or both of the fibers contain cores, stress rods, holes, or other structures the positions of which rotate or twist about the axis of one or both fibers at a determined rate over at least a portion of the length of the fiber, comprising:

positioning the fibers to be coupled in axial alignment with one another so that end faces of the fibers and cores or other structures contained in the fibers confront one another at the end faces in the axial direction;

producing one or more side view images of end regions of the aligned fibers adjacent to the end faces including certain ones of the cores or other structures contained in the fibers;

for each fiber, constructing a slope line based on a side view image of a given core or other structure in the fiber, and aligning the slope line with and displaying the line over the image of the core or structure near an endface of the fiber; and rotating one or both of the fibers about their axes until the slope lines displayed over the given core or structure in the fibers would coincide if the gap were eliminated, thus aligning all the cores or structures in both fibers optimally when the end faces of the fibers are coupled.

12. The method of claim 10, including using a profile alignment system (PAS) fusion splicer to perform at least some of the steps.

13. A method of coupling two optical fibers to one another, wherein one or both of the fibers contain cores, stress rods, holes, or other structures the positions of which rotate or twist about the axis of one or both fibers at a determined rate over at least a portion of the length of the fiber, comprising:

positioning the fibers to be coupled in axial alignment with one another so that end faces of the fibers and cores or other structures contained in the fibers confront one another at the end faces in the axial direction;

producing one or more side view images of end regions of the aligned fibers adjacent to the end faces including certain ones of the cores or other structures contained in the fibers;

for each fiber, constructing a slope line based on a side view image of a given core or structure in the fiber near an endface of the fiber; and rotating one or both of the fibers about their axes until facing end points of the slope lines are aligned with one another at the fiber endfaces, thus aligning all the cores or structures in both fibers optimally when the end faces of the fibers are coupled.

14. The method of claim 13, including using a profile alignment system (PAS) fusion splicer to perform at least some of the steps.

* * * * *